United States Patent
Kogowski et al.

(10) Patent No.: US 6,482,893 B1
(45) Date of Patent: Nov. 19, 2002

(54) METHOD OF IMPROVING THE WEATHERBILITY AND COLOR RETENTION PERFORMANCE OF STYRENE COPOLYMER COMPOSITIONS

(75) Inventors: Gary J. Kogowski, Farmington Hills, MI (US); Heiner Goerrissen, Ludwigshafen; Graham Edmund McKee, Neustadt/Weinstrasse, both of (GB)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/664,651

(22) Filed: Sep. 19, 2000

(51) Int. Cl.$^7$ .............. C08L 9/00; C08L 25/02; C08L 33/04; C08L 35/02
(52) U.S. Cl. ............ 525/191; 525/222; 525/232; 525/241
(58) Field of Search .............. 525/191, 222, 525/232, 241

(56) References Cited

U.S. PATENT DOCUMENTS 5,658,985 A * 8/1997 Eichenauer et al. .......... 525/83

* cited by examiner

Primary Examiner—Nathan M. Nutter
(74) Attorney, Agent, or Firm—Fernando A Borrego

(57) ABSTRACT

Styrene copolymer compositions, especially ASA compositions, exhibit improved weatherability and color retention performance when processed according to the invention. Disclosed herein is a method of improving the weatherability and color retention performance of styrene copolymer compositions and exterior siding incorporating such styrene copolymer compositions. More specifically, a method is disclosed comprising improving the weatherability and color retention of styrene copolymer compositions, especially ASA compositions, which is advantageous with respect to cost and ease of manufacturing. Composite articles are also disclosed incorporating the foregoing improved styrene copolymer compositions as an exterior layer.

7 Claims, 2 Drawing Sheets

US 6,482,893 B1

METHOD OF IMPROVING THE WEATHERBILITY AND COLOR RETENTION PERFORMANCE OF STYRENE COPOLYMER COMPOSITIONS

FIELD OF THE INVENTION

This invention relates to styrene copolymer compositions having improved weatherability and color retention performance of an exterior siding of a structure, composite articles utilized for the exterior siding that utilize such compositions, and a method of improving the weatherability and color retention performance of the styrene copolymer compositions. More particularly, this invention relates to weather-resistant and color retaining styrene copolymer compositions, especially acrylonitrile-styrene-acrylate ("ASA") compositions, having improved weatherability and color retention, and to multi-layer composites incorporating such compositions. The composite articles are utilized as exterior siding for the structures throughout the building and construction industry.

BACKGROUND OF THE INVENTION

Two-phase styrene copolymer resins composed of a resin matrix and an elastomeric or rubber component are known to provide a number of useful properties. Illustrative examples are ASA, olefin-styrene-acrylonitrile (OSA) or acrylonitrile-EPDM-styrene resins (AES), and acrylonitrile-butadiene-styrene (ABS). These resins find use in a variety of applications in the building and construction markets (home and commercial siding, window and door profiles, gutters), in leisure and recreation applications (spas, marine components, outdoor furniture, snowmobile components, recreational vehicles, motor homes, campers, etc.) and in the automotive industry (body side moldings, bumpers, interior trim, and mirror housings).

Depending on the particular resin and elastomeric compositions, various performance characteristics are possible. For example, ABS resins generally provide good low temperature impact resistance and processability. ASA and AES resins are particularly known for desirable impact strength, processability and weather resistance, that is, physical property retention and relatively acceptable color retention after significant outdoor exposure.

The prior art has long desired to provide styrene copolymer resins and/or compositions which possess the preceding advantageous physical and performance characteristics but exhibit improved weatherability performance and superior color retention. In particular, it would be advantageous to provide ABS, AES and ASA compositions, especially ASA compositions, having improved weatherability performance via superior color retention and desirable performance properties. Such compositions would be of benefit in the building and construction industries, especially with respect to the manufacture of exterior siding.

Previous attempts to provide styrene copolymer compositions having improved weatherability performance and exterior sidings made thereof have been widespread, yet relatively unsuccessful. For instance, these attempts have included the specialized embossing of mold surfaces of the styrene copolymer composition to minimize the effect of color differential, or fade, over exposure. This attempt failed to provide sufficient color retention and was disadvantageous with respect to processing, cost and/or other performance considerations.

A further attempt to improve the performance of styrene copolymer compositions and sidings made thereof has been to increase amounts of ultra-violet (UV) additive packages known in the art. Although some improvement in weatherability performance and color retention were realized, such attempts are exceedingly costly.

A further attempt to improve the weatherability performance has been to increase pigmentation, particularly $TiO_2$, responsible for contributing to the overall opacity, and therefore reflectivity and weatherability, of the resultant exterior siding. This attempt failed to provide sufficient color retention and was disadvantageous because light resistance of $TiO_2$ pigmentation over exposure to weathering was inadequate.

In sum, the prior art attempts detailed above have generally been characterized by one or more disadvantages, especially with respect to the adequacy of color retention over exposure, quality of surface appearance of the resultant exterior siding, cost considerations as in the increased amounts of UV additive packages, ease of manufacturing, ease of processing, and/or the performance properties of the compositions and the resultant exterior siding.

Accordingly, it would be advantageous to provide styrene copolymer compositions, especially ASA compositions, which exhibit desirable performance properties, improved weatherability and color retention performance as compared to traditional styrene copolymer compositions, advantageous cost considerations, and ease of manufacturing and/or processing.

It is also desirable to provide composite articles incorporating such styrene copolymer compositions, especially ASA compositions, which are suitable for use as exterior siding. It is also desirable to provide a method of improving the weatherability and color retention performance of the styrene copolymer compositions, particularly with respect to exterior siding made of such styrene copolymer compositions.

SUMMARY OF THE INVENTION

It is an object of this invention to provide styrene copolymer compositions, especially ASA compositions, which exhibit improved weatherability and color retention performance when processed.

It is another object of this invention to provide a method of improving the weatherability and color retention performance of styrene copolymer compositions and exterior siding. More specifically, it is an object of this invention to provide a method of improving the weatherability and color retention of styrene copolymer compositions, especially ASA compositions, which is advantageous with respect to cost and ease of manufacturing.

Finally, it is an object of the invention to provide a composite incorporating the foregoing improved styrene copolymer compositions as an exterior layer. More specifically, it is an object of the invention to provide styrene copolymer compositions, especially ASA compositions, which can be used in the manufacture of weatherable, color-retaining exterior siding composite structures.

DETAILED DESCRIPTION OF A PREFERRED EMBODIMENT

Figure 1:
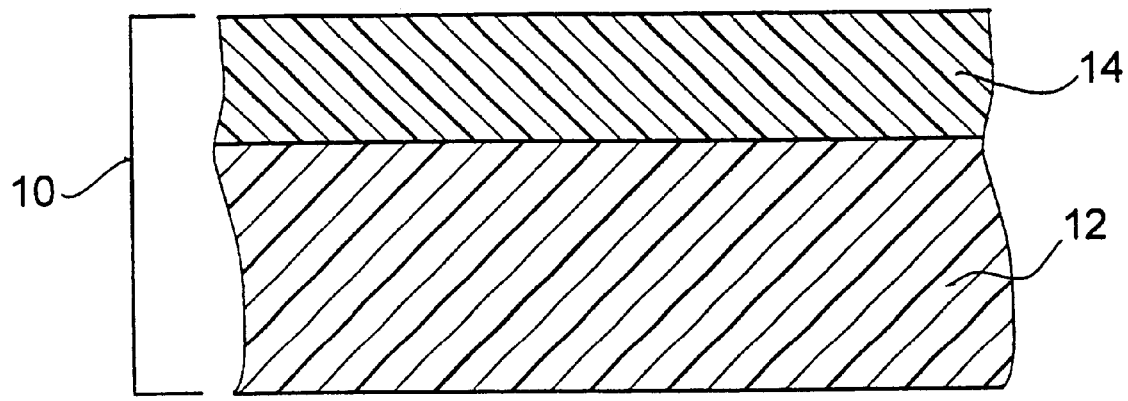
FIG. 1 is an enlarged, partial cross-sectional view of one embodiment of the composite structure of the invention showing a weatherable and color-retaining styrene copolymer exterior layer adhered to a polyvinylchloride (PVC) interior layer.

This invention satisfies the foregoing objects and more by providing a particular styrene copolymer composition which requires the addition of from 0.1 to 20% by weight of the total composition, of a partially crystalline polymer as a color retention agent. In a preferred embodiment of the subject invention, the particular styrene copolymer composition requires the addition of from 1 to 10% by weight of the partially crystalline polymer, and more preferably the addition of from 2 to 8%. Polyamides, polyamide copolymers, or mixtures thereof can be used as the color retention agent in the above amounts. The styrene copolymer composition of the invention includes a graft copolymer resin (A) (or mixture of different graft copolymers) which results from polymerizing one or more monomers (A1) selected from the group consisting of (i) aromatic vinyl compounds, (ii) ethylenically unsaturated compounds, and (iii) mixtures thereof, in the presence of an elastomeric rubber (A2) (or mixture of different elastomers) in particulate form. The elastomeric rubber (A2) in particulate form results from polymerizing one or more monomers selected from the group consisting of (i) alkyl acrylates having from 1 to 32, preferably 1 to 8 carbon atoms, (ii) butadiene or isoprene, (iii) olefin compounds (other than ii), (iv) ethylenically unsaturated compounds, (v) aromatic vinyl compounds, (vi) polyfunctional monomers having a cross-linking effect, and (vii) mixtures thereof. The thermoplastic resin compositions of the invention require from 0.1 to 20% by weight of the color retention agent (B), all percents by weight being based on the total weight of the composition.

The invention further provides a method of improving the weatherability and color retention performance of the styrene copolymer composition by adding to a styrene copolymer resin (A), from 0.1 to 20% by weight of the color retention agent (B), based on the total weight of the composition, preferably at temperatures from about 20° C. below the melting point of (B) to temperatures above the melting point of (B).

Finally, the invention also provides a composite suitable for use as exterior siding for a structure, the composite comprising at least one interior layer (I) comprising a thermoplastic resin, and at least one exterior layer (II) having a styrene copolymer comprising the foregoing copolymer (A) and from 0.1 to 20% by weight of the color retention agent (B), all percents by weight being based on the total weight of the composition, wherein exterior layer (II) is continuous and coextensive with interior layer (I).

In the most preferred embodiment of the present invention, the invention is intended to provide a styrene copolymer composition comprising a styrene copolymer (A) and a polyamide or a polyamide copolymer (B).

As used herein, it is to be understood in the art that the terms "weatherable" or "color-retaining" refer to a Δb value after six cycles of artificial weathering in a QUV weatherometer (see Example 1) falling within the range of from 0.1 and 1.5 Δb units as measured by a Minolta CM-2002 spectrophotometer in CIE L*a*b* Units, Illuminant D65, 10 degree Observer. Color retention is measured on extruded monolayer styrene copolymer or coextruded sheets having an outer layer of styrene copolymer, the thickness of the styrene copolymer in either case generally ranging from 5 to 50 mils (0.127 to 1.27 mm).

Styrene copolymer as used herein generally refers to polymer compositions or resins resulting from the polymerization or copolymerization of at least one vinyl aromatic monomer. Preferably, the at least one vinyl aromatic monomer will be copolymerized with a vinyl cyanide. Most preferably, all or part of the at least one vinyl aromatic monomer and the at least one vinyl cyanide will be copolymerized in the presence of an elastomeric or rubber component. The styrene copolymers suitable as component (A) of the invention are preferably graft copolymers. Must preferably, the graft copolymers will have a core/shell structure. Preferably, the styrene copolymer (styrene resin (A)) will contain certain rubber particles (A2) grafted with one or more monomers (A1). In some cases, the at least one vinyl aromatic monomer and the at least one vinyl cyanide will be copolymerized in the presence of a linear polyalkyldiene (which lead to ABS). Preferably, this graft shell of the rubber particles will be formed by polymerizing styrene and acrylonitrile in the presence of the rubber. Likewise suitable as component (A) are mixtures of graft copolymers and polymers or copolymers of at least one vinyl aromatic monomer and at least one vinyl cyanide monomer (A3). This mixture can either be prepared by mixing of graft copolymer with (A3) or is formed in situ. The latter is the case, if not all of the vinyl aromatic and vinyl cyanide monomers are grafted onto the elastomeric or rubber component.

Styrene resin (A) will generally result from the polymerization or copolymerization of at least one monomer (A1). Monomers (A1) may generally be those monomers used in the production of styrene copolymers. Such monomers are typically described as (i) aromatic vinyl compounds, (ii) ethylenically unsaturated compounds, and/or (iii) mixtures thereof.

Illustrative examples of aromatic vinyl compounds (i) are styrene, α-methylstyrene, o-methylstyrene, p-methylstyrene, m-methylstyrene, 1,3-dimethylstyrene, tertbutylstyrene, vinylnaphthalene, and the like. Preferred aromatic compounds (i) are styrene, α-methylstyrene, p-methylstyrene and tertbutylstyrene. Most preferred aromatic compounds (i) are styrene and α-methylstyrene.

Illustrative examples of ethylenically unsaturated monomers (ii) are compounds such as vinyl cyanides such as acrylonitrile, methacrylonitrile, alkylacrylates and alkylmethacrylates having from 1 to 4 carbon atoms in the alkyl moiety, acrylic acid, methacrylic acid, maleic anhydride, acrylamide, and/or vinyl methyl ether. Preferred ethylenically unsaturated monomers (ii) are vinyl cyanides such as acrylonitrile.

When styrene resin (A) results solely from the polymerization or copolymerization of one or more monomers (A1), the amounts of monomers (i) and/or (ii) are dependent upon the desired properties of resin (A). However, it is most preferred that one or more monomer (A1) contain at least one monomer which is an aromatic vinyl compound (i). Preferably, one or more monomer (A1) will have at least 20 weight percent of an aromatic vinyl compound (i), based on the total weight of one or more monomer (A1). Most preferably, one or more monomer (A1) will have from 30 to 85, preferably from 30 to 75 weight percent of aromatic vinyl compound (i).

Monomers (A1) may be polymerized by traditional processes known to those skilled in the art. Polymerization may be carried out in mass, solution, suspension, or aqueous emulsion. Free radical polymerization is preferred, especially when (A) is SAN and monomers (A1) are styrene and acrylonitrile.

Styrene resin component (A) may also be a graft copolymer resin such as are well known in the art. An illustrative example is disclosed in U.S. Pat. No. 4,634,734, hereby incorporated by reference in its entirety.

For example, resin (A) may comprise the polymerization reaction product of one or more monomers (A1) in the presence of an elastomeric rubber (A2). Elastomeric rubber (A2) may also be referred to as a grafting base. It will be appreciated that a great variation in the performance properties of resin (A) may be obtained depending upon the selection of rubber or grating base (A2).

Examples of suitable rubbers (A2) are polybutadiene, polyisoprene, styrene-butadiene copolymers, acrylonitrile-butadiene copolymers, acrylonitrile-butadiene copolymers, alkylacrylate rubbers, EPM rubbers (ethylene/propylene rubbers), EPDM rubbers (ethylene/propylene/diene rubber containing a non-conjugated diene, such as, for example, 1,5-hexadiene or norbornadiene, in small quantities as the diene), and silicone rubbers.

Those skilled in the art will appreciate that elastomeric rubber (A2) may result from the polymerization or copolymerization of one or more monomers (A2') selected from the group consisting of (i) alkyl acrylates having from 1 to 8 carbon atoms in the alkyl group, (ii) a 1,3-diene, (iii) olefin compounds, (iv) ethylenically unsaturated compounds, (v) aromatic vinyl compounds, (vi) polyfinctional monomers having a crosslinking effect, and (vii) mixtures thereof Rubber (A2) may result from the polymerization or copolymerization of one or more monomers (A2') selected from the group of (i) alkyl acrylates having from 1 to 8 carbon atoms in the alkyl group. Preferred are alkyl acrylates having from 4 to 8 carbons in the alkyl moiety. Most preferred examples are n-butyl acrylate and ethylhexyl acrylate. Monomer (A2') can be one or more alkyl acrylates alone or in admixture with one another. Suitable alkyl acrylates may also be mixed with suitable monomers selected from monomers (ii)–(vi) described herein.

One or more monomers (A2') may also be selected from the group consisting of 1,3-dienes (ii). Illustrative examples are butadiene, isoprene, and the like. The 1,3-dienes may be used alone, in admixture with other 1,3-dienes, or mixed with other suitable monomers selected from monomers (i) and/or (iii)–(vi) described herein. For example, it will be appreciated that when resin (A) is an ABS resin, rubber (A2) may be a conjugated di olefin polymer latex such as polybutadiene or an elastomeric butadiene copolymer of butadiene-styrene, butadiene-acrylonitrile, butadiene-alkyl acrylates, and the like.

Monomers (A2') may also be one or more olefins (iii). Illustrative examples of olefins (iii) are those aliphatic compounds having from 2 to 4 carbons such as ethylene, propylene, butyl and the like. Preferred are ethylene and propylene. Olefins (iii) may be used alone as monomer (A2') or in admixture with each other or mixed with one or more other monomers selected from monomers (i)–(ii) and/or (v)–(vi).

Monomers (A2') may be selected from monomers which are ethylenically unsaturated compounds (iv). Ethylenically unsaturated compounds suitable for use as monomer (iv) and hence monomer (A2') are those as described above with respect to monomers suitable for use as one or more monomers (A1) (ii). Other illustrative examples include hydroxyalkyl acrylates or methacrylic. Preferred hydroxyalkyl acrylates/methyacrylates are those having from 2 to 6 carbon atoms in the alkyl moiety. One or more of the monomers (A2') may be an ethylenically unsaturated compound alone, or in admixture with another ethylenically unsaturated compound, or an ethylenically unsaturated compound mixed with one or more other monomers selected from monomers (i)–(iii) and/or (v)–(vi).

One or more monomers (A2') may also be selected from aromatic vinyl compounds (v). Aromatic vinyl compounds suitable for use as monomers (v) and hence, one more monomers (A2') are those described above with respect to monomers (A1) (i). Styrene is particularly preferred for use as a monomer (v). One or more of the monomers (A2') may be an aromatic vinyl compound alone, or in admixture with another aromatic vinyl compounds, or an aromatic vinyl compound mixed with one or more other monomers selected from monomers (i)–(iv) and/or (vi).

Monomers suitable for use as polyfunctional monomers (vi) having a crosslinking effect are those which contain at least two double bonds capable of copolymerization. Examples are divinylbenzene, diallyl maleate, diallyl fumarate, diallyl phthalate, allyl methacrylate, butanediol diacrylate, hexanediol diacrylate, butadiene, isoprene, triallyl cyanurate and triallyl isocyanurate. A preferred monomer (vi) is the acrylic ester of tricyclodecenyl alcohol.

Elastomeric rubber (A2) may be made by polymerization processes known to those skilled in the art. Such processes include emulsion polymerization and bulk or solution polymerization followed by emulsification of the resulting polymers. An illustrative example of emulsion polymerization is described in U.S. Pat. No. 5,252,666 and in DE-A12 60 135, the disclosures of which are incorporated by reference herein in their entirety.

It will be appreciated that graft copolymers suitable for use in this invention may, and preferably will have, a core/shell structure. Such structures are described in U.S. Pat. No. 5,252,666. It will be appreciated that the foregoing rubber (A2) will generally form the core. The surrounding core may be formed by the polymerization of the monomers (A1) or the like in the presence of the elastomeric rubber (A2). Such processes are further described in U.S. Pat. No. 5,252,666.

A most preferred rubber will have a weight average particle size of from 50 to 1000, preferably from 50 to 800, more preferably, from 50 to 600 nm.

The polymer surrounding the core/shell particles will generally be a polymer matrix, typically a rigid copolymer. Those skilled in the art will appreciate that such may comprise the polymerized free ungrafted monomers (A1) resulting from the polymerization of monomers (A1) in the presence of elastomeric core (A2) and the production of the desired core/shell structure. Alternatively, resin (A) may be formed from the mixing of separately prepared polymer or copolymer (A3) with either elastomeric rubber (A2) or the polymerization reaction product of monomers (A1) in the presence of elastomeric rubber (A2), i.e., graft copolymers having a core/shell structure.

Copolymer (A3) will generally result from the polymerization or copolymerization of one or more monomers such as those described above with respect to monomers (A1). Styrene, alpha methyl styrene, and acrylonitrile are preferred, with mixtures of styrene and acrylonitrile being most preferred. (A3) may be a mixture of copolymers, e.g., styrene-acrylonitrile copolymer with α-methylstyrene-acrylonitrile copolymer. Copolymer (A3) will generally have from 20 to 50 percent by weight of monomers (A1) (ii), based on the weight of copolymer (A3). Monomers (A1) (ii) will preferably be present in an amount of from 10 to 94, such as 35 to 94, preferably 10 to 90 percent by weight, based on the weight of the total composition of (A1), (A2), and (A3).

Copolymer (A3) may thus be a styrene/acrylonitrile copolymer, an α-methylstyrene/acrylonitrile copolymer, a styrene/methyl methacrylate copolymer, a styrene/maleic anhydride copolymer or an α-methylstyrene/styrene/acrylonitrile-, a styrene/acrylonitrile/methylmethacrylate-, a styrene/acrylonitrile/maleic anhydride or a styrene/acrylonitrile/acrylic acid terpolymer, or an a-methylstyrene/styrene/acrylonitrile terpolymer or mixtures thereof. If copolymer (A3) consists of mixtures of the above, the acrylonitrile content of the various copolymers containing acrylonitrile should preferably not differ from each other by more than 10 percent by weight, most preferably by not more than percent by weight based on the copolymer.

Most preferably, copolymer (A3) will be a styrene-acrylonitrile SAN resin or an α-methylstyrene-acrylonitrile resin or mixtures thereof. Suitable SAN copolymers are those discussed above with respect to copolymer (A1). A commercially available SAN resin suitable for use in the instant invention as component (A3) is SAN resins available from BASF Corporation, Mount Olive, N.J. Particularly suitable and preferred commercially available materials are grades 358N, 368R, 378P, 388S, and KR 2556. These are characterized by their content of styrene, α-methylstyrene and/or substituted styrenes of from 50 to 100, preferred 60 to 95, especially preferred, 60 to 90% by weight, based on the SAN. Their (meth)acrylonitrile content can be up to 42%, preferably from 5 to 40, in particular, from 7 to 38% by weight, based on the SAN. The remaining portions can be $C_1$- to $C_8$-alkylesters of (meth)acrylic acid, maleinimide, N-methyl-N-phenyl- or N-cyclohexylmaleinimide or maleic anhydride. Their viscosity numbers are generally from 40 to 160, preferably from 45 to 120 ml/g (as measured according to DIN 53 726 at 25° C. in 0.5% by weight in dimethylformamid), corresponding to a weight average molecular weight ($M_w$) of from 40,000 to 200,000 g/mol.

Polymerization processes such as those described above with respect to the polymerization of monomers (A1) are suitable for the production of copolymer (A3). Generally, copolymers (A3) will have viscosity numbers of from 40 to 100, particularly of 50 to 90.

If copolymer (A3) does not result from the polymerization of monomers (A1) in the presence of elastomeric rubber (A2), copolymer (A3) may be incorporated with the polymerization reaction product of monomers (A1) in the presence of elastomeric rubber (A2), by processes known to those skilled in the art. Copolymer (A3) may be mixed all at once with the polymerization reaction product of monomers (A1) and (A2'), or may be mixed in smaller portions.

Traditional compounding techniques, such as extrusion compounding using single or twin screw extruders, may be used. For example, one preferred method is to intensively mix a melt of the copolymer (A3) with the result of copolymerized graft copolymer of (A1) and (A2) at temperatures above 200° C. Alternatively, if the various copolymer components were prepared by emulsion polymerization, the resultant polymer dispersions can be mixed and the polymer mixture processed. Preferably, copolymer (A3) will be mixed with the graft copolymer of (A1) and (A2) by combined extrusion, kneading or rolling of the components. Those skilled in the art will appreciate that prior to this it is necessary to isolate the components from the solution or aqueous dispersion resulting from the polymerization. Partial dewatering of the grafting copolymerization products obtained in an aqueous dispersion, i.e., graft copolymer of (A1) on (A2), is also possible and can be mixed with copolymer (A3) as damp crumbs with complete drying of the copolymerized graft copolymer mixtures taking place during the mixing process.

Styrene copolymer resin (A) may additionally contain additives such as are commonly included for styrene copolymer resins. Examples include fillers, other compatible plastics, antistatics, antioxidants, flame-retardants, lubricants, colorants, pigments and/or dyes. Such additives are commonly used in amounts of from 0.1 to 70 parts by weight based on 100 parts by weight of the resin (A), or (A1)+(A2)+(A3). In addition, dyes and pigments may be incorporated into resin (A) in amounts of from 0.02 to 10 parts by weight, based on the weight of resin (A).

While resin (A) may be any of the styrene copolymer resins discussed above, i.e., SAN, ASA, ABS, AES, or the like, it is preferred that resin (A) be SAN, ABS, or ASA. Most preferably, resin (A) will be ASA. An illustrative and suitable resin (A) may have an elastomeric phase (A2) of butylacrylate and tricyclodecenylacrylate and is grafted with (A1) styrene and acrylonitrile in a ratio of 75 to 25 and is mixed with a styrene/acrylonitrile copolymer or α-methylstyrene-acrylonitrile copolymer (A3) having an acrylonitrile content of 22 to 35 percent.

In particular, resins suitable for use in the instant invention as resin (A) are the LURAN S ASA resins, commercially available from BASF Corporation, Mount Olive, N.J. A most preferred resin (A) is LURAN S ASA resin grade 797 SE.

According to the invention, the color retention agent (B) is a partially crystalline polymer. Among these partially crystalline polymers, polyamides, in particular polyamide 6.6 and aromatic copolyamides, or copolymers thereof may be used as component (B). Mixtures of different partially crystalline polymers may also be employed as color retention agent (B).

Preferably, the color retention agent (B) is a polyamide or a mixture of different polyamides. As referenced initially above, one of the preferred polyamides is polyamide 6.6. Generally, B can be a partly aromatic copolyamide or a mixture of two or more different partly aromatic copolyamides.

The partly aromatic copolyamides (B) present in the styrene copolymer compositions according to the invention contain as component ($B_1$) 20–90% by weight of units derived from terephthalic acid and hexamethylenediamine. A small proportion of terephthalic acid, preferably not more than 10% by weight of the total aromatic dicarboxylic acids used, can be replaced by isophthalic acid or other aromatic dicarboxylic acids, preferably by those where the carboxyl groups are para-disposed. Besides the units derived from terephthalic acid and hexamethylenediamine, copolyamides B) contain as component $B_2$) units derived from ε-caprolactam and/or contain as component $B_3$) units derived from adipic acid and hexamethylenediamine.

The proportion of units derived from ε-caprolactam is not more than 50% by weight, preferably from 20–50% by weight, in particular 25–40% by weight, while the proportion of units derived from adipic acid and hexamethylenediamine is up to 80% by weight, preferably 30–75% by weight, in particular 35–65% by weight.

Copolyamides B) may also contain units not only of ε-caprolactam but also of adipic acid and hexamethylenediamine; in this case, it is an advantage for the proportion of units which are free of aromatic groups to be not less than 10% by weight, preferably not less than 20% by weight. The ratio of units derived from ε-caprolactam and units derived from adipic acid and hexamethylenediamine here is not subject to any particular restriction.

Figure 2:
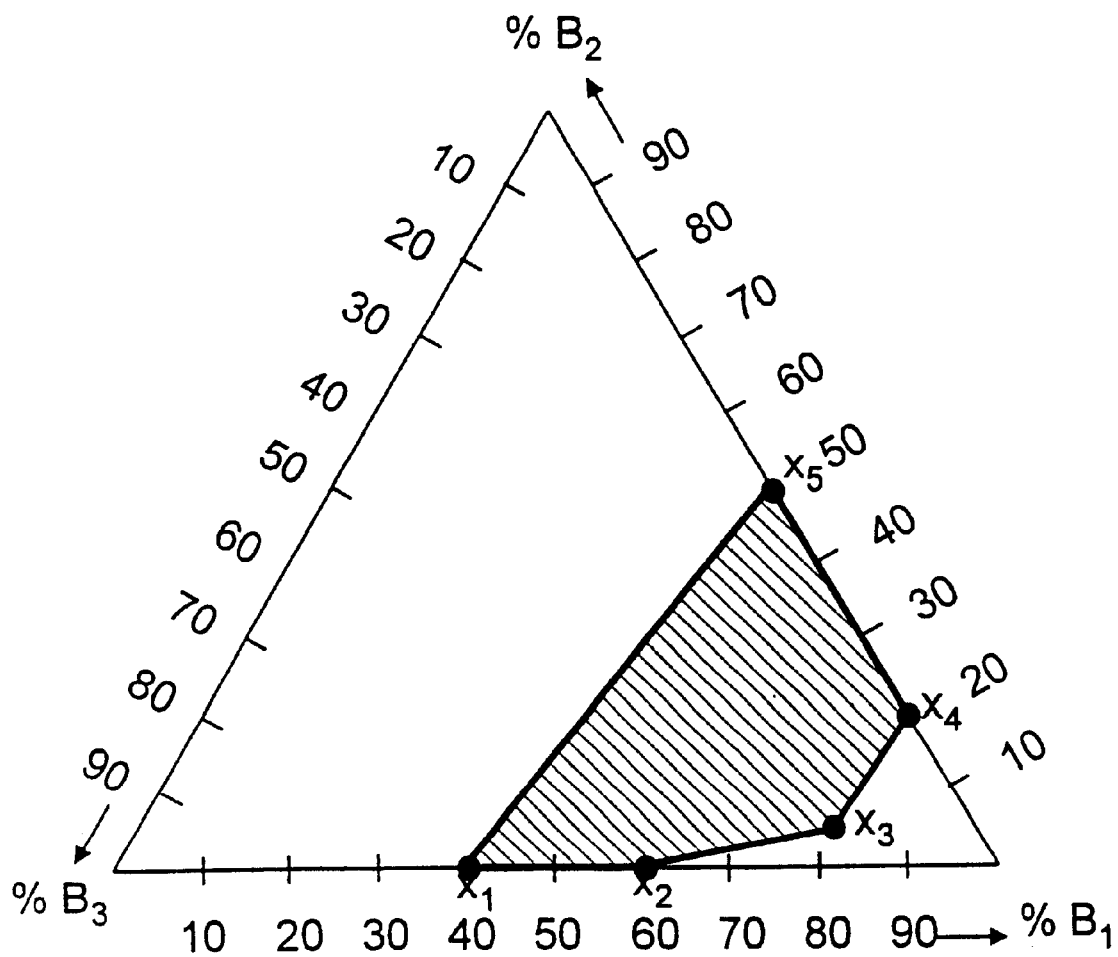
FIG. 2 shows the ternary diagram in which is displayed the pentagon defined by points as disclosed herein for preferred copolyamides of the present invention.

Preference is given to copolyamides whose composition in a ternary diagram is within the pentagon defined by the corner points $X_1$ to $X_5$ (see FIG. 2), which are each in turn defined as follows:

$X_1$ 40% by weight of units $B_1$) 60% by weight of units $B_3$)

$X_2$ 60% by weight of units $B_1$) 40% by weight of units $B_3$)

$X_3$ 80% by weight of units $B_1$) 5% by weight of units $B_2$) 15% by weight of units $B_3$)

$X_4$ 80% by weight of units $B_1$) 20% by weight of units $B_2$) $X_5$ 50% by weight of units $B_1$) 50% by weight of units $B_2$)

Particular advantageousness for many purposes has been found to be possessed by polyamides containing 50–80, in particular 60–75% by weight of units derived from terephthalic acid and hexamethylenediamine (units $B_1$)) and 20–50, preferably 25–40, percent by weight of units derived from ε-caprolactam (units $B_2$)).

Besides the above-described units $B_1$) to $B_3$), the partly aromatic copolyamides B) may additionally contain minor amounts, preferably not more than 15% by weight, in particular, not more than 10% by weight, of further polyamide units of the type known from other polyamides. These units may be derivative from dicarboxylic acids of 4–16 carbon atoms and aliphatic or cycloaliphatic diamines of 4–16 carbon atoms and from aminocarboxylic acids and the corresponding lactams of 7–12 carbon atoms. Suitable monomers of these types are suberic acid, azaleic acid, sebacic acid and isophthalic acid, merely mentioned as representatives of dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane, merely mentioned as representatives of diamines and capryllactam, enantholactam, omega-aminoundecanoic acid and laurolactam, merely mentioned as representatives of lactams or aminocarboxylic acids.

Particular advantageousness has been found to be possessed by partly aromatic copolyamides whose triamine content is less than 0.5, preferably less than 0.3, percent by weight.

Most existing processes give partly aromatic copolyamides having triamine contents of above 0.5% by weight, which has an adverse effect on product quality and leads to problems in continuous production. A particular triamine responsible for these problems is dihexamethylenetriamine, which forms from the hexamethylenediamine starting material.

Copolyamides having a low triamine content have lower melt viscosities if compared at the same solution viscosity with products of the same composition but a higher triamine content. This fact has positive effects not only on the processability but also on the product characteristics.

The melting points of partly aromatic copolyamides B) are within the range from 260° C. to above 300° C., this high melting point also being associated with a high glass transition temperature, generally of more than 75, in particular, of more than 85° C. (in the dry state).

Binary copolyamides based on terephthalic acid, hexamethylenediamine and ε-caprolactam have if they contain about 70% by weight of units derived from terephthalic acid and hexamethylenediamine melting points within the range of 300° C. and (in the dry state) a glass transition temperature of more than 110° C.

Binary copolyamides based on terephthalic acid, adipic acid and hexamethylenediamine have melting points of 300° C. or more at even lower levels of about 55% by weight of units from terephthalic acid and hexamethylenediamine (HMD), although the glass transition temperature is not quite as high as in the case of binary copolyamides which contain ε-caprolactam in place of adipic acid or adipic acid/HMD.

The preferred partly aromatic copolyamides of low triamine content can be prepared by the processes described in EP-A-129 195, EP-A-129 196 and U.S. Pat. No. 5,252,661, the disclosures of which are incorporated herein by reference.

Component B may be added to resin component (A) by traditional compounding methods known to those skilled in the art and as discussed above with respect to the incorporation of copolymer (A3). Most preferably, component (B) will be mixed with resin component (A) using a twin screw compounding extruder or the equivalent. Preferably during the addition of component B to component A, temperatures above the melting temperature of B to a temperature which is lower than the melting temperature of B by at most 20° C. should be used. Preferably, during the addition of component B to component A the temperature should not exceed 310° C. but should at least be a high as the melting temperature of component B minus 10° C.

The method and composition of the invention generally require that no more than 20% by weight of the total composition of A+B be comprised of component B. Amounts of component B greater than 20% by weight of the total composition have been found to affect the performance properties of the finished composition, especially with respect to impact properties. Those skilled in the art will appreciate that when the composition of A+B comprises more than 50% B, the main phase becomes B and is no longer a styrene copolymer.

It is desirable that the compositions of the invention have an optimal balance of weatherability and color retention properties, and performance properties, especially impact properties. The compositions of the invention will have from 0.1 to 20% of component (B). Preferably, the compositions of the invention will have from 1 to 10% and most preferably from 2 to 8% by weight of component (B), based on the weight of components (A) and (B). The compositions of the invention are further characterized by useful performance properties, especially with respect to impact strength.

Although the compositions of the invention will find use in a variety of applications, they are particularly well suited for use in exterior applications such as siding, window frames and the like. A most preferred use is in a composite suitable for use as exterior siding for a structure.

The composite of the invention has at least one interior layer (I) which is a thermoplastic and at least one exterior layer (II) which includes the weatherable styrene compositions of the invention. Exterior layer (II) will generally be continuous with and in communication with interior layer (I). Turing to FIG. 1, it can be seen that composite 10 is comprised of interior layer 12 and exterior layer 14. The composite 10 will be used so that interior layer 12 is positioned so as to be protected from exposure to light and weather, i.e., next to the surface of a building or structure, while weatherable exterior layer 14 faces outward toward exposure from light and weather.

Interior layer (I) 12 will be comprised of at least one polymeric layer but may be a multilayer polymeric structure. Layer 12 will generally be comprised of ABS, PVC (poly (vinylchloride)), or mixtures thereof. Preferably, layer (I) will be a PVC substrate such as a rigid (non-plasticized) PVC substrate with or without additives such as impact modifiers (such as CPE, acrylic, styrenic block copolymers); processing aids; thermal and oxidative stabilizers; UV stabilizers; fillers (such as talc, $TiO_2$, calcium carbonate); pigments and recycled products.

Exterior layer (11) 14 will be a styrene composition comprising styrene resin (A) and color retention agent (B)

according to the subject invention. Most preferably, exterior layer 14 will comprise an ASA resin (A) such as described above and from 2 to 8% by weight of color retention agent (B), based on the weight of (A)+(B).

Interior layer (I) 12 will generally have a thickness of from 10 to 100 mils and preferably from about 25 to 50 mils (0.63 to 1.27 mm).

Exterior layer (II) 14 will generally have an average thickness of from 4 to 15 mils (0.1016 to 0.381 mm). Preferably exterior layer 14 will have an average thickness of from 4 to 10 mils (0.1016 to 0.254 mm).

It will be appreciated that the thickness of both layers 12 and 14 will vary as a result of the coextrusion process. For example, layer 14 may typically show film thickness ranging from 7 mils to 11 mils (0178 to 0.279 mm), with an average film thickness of approximately 9 mils (0.229 mm).

The composite of the invention will be formed by coextruding techniques such as are well known to those skilled in the art. Exterior layer 12 and interior layer 14 will be simultaneously extruded in the form of mono- or multilayer sheets such that layer 12 is continuous with and in communication with layer 14.

The coextrusion process of the composite of the invention will preferably take place at temperatures less than 450° F. (250° C.). Most preferably, the composite of the invention will be extruded at temperatures of between 320° to 400° F. (1780 to 222° C.).

Alternatively, the parts can be formed from the styrene copolymer compositions according to the invention by injection molding. Thereby, it is preferred to use injection molding temperatures of above the melting temperature of A and below the melting temperature of the color retention agent B.

The following examples are intended to illustrate but not limit the invention.

EXAMPLE 1

Traditional styrene copolymer compositions for use as controls ("Control ASA resin 1–3") were prepared by adding approximately 3.0% titanium dioxide to an ASA resin (a UV-stabilized, high impact ASA resin with a tensile modulus of elasticity of approx. 2000 MPa, determined according to ISO 527), to approximately 4.5 to 6.0% of a polyethyleneterephthalate (PET) or polybutyleneterephthalate (PBT) polyester, and to approximately 0.9 to 1.0% of a UV stabilizer package.

A weatherable and color-retaining styrene copolymer composition according to the subject invention ("Improved ASA resin #1") was prepared by adding approximately 3.0% titanium dioxide and approximately 6.0% of a low viscosity (2.5g/ml by dilute solution viscosity technique in 98% sulfuric acid) nylon 6,6 compound to an extrudable acylonitrile styrene acrylate (ASA) resin copolymer. A second weatherable and color-retaining copolymer composition according to the subject invention ("Improved ASA resin #2") was prepared by adding approximately 3.0% titanium dioxide and approximately 6.0% of an intermediate viscosity (3 g/ml by dilute solution viscosity technique in 98% sulfuric acid) nylon 6,6 compound an extrudable acylonitrile styrene acrylate (ASA) resin copolymer. The nylon 6,6 compounds were added as the color retention agent polyamide 6.6 in place of the polyesters of the conventional control composition of styrene copolymer compositions. Amounts UV stabilizer package in Improved ASA resins #1 and 2 were equivalent to that of the controls.

Both the Control ASA resins 1–3 and the Improved ASA resins #1 and 2 were prepared using a twin screw extruder to incorporate the $TiO_2$ and the PET, PBT, or Ultramid.

Test plaques were extruded using an extruder. A blue pigment was dosed into each material during extrusion to simulate colorant systems typically used by the siding industry. Each extruded sheet was about 50 mils in thickness and embossed as typical of PVC siding profiles. The sheets were allowed to cool and color retention measurements were recorded for each temperature profile. The sheets were extruded at three temperatures; 370° F. (188° C.), 400° F. (204° C.), and 430° F. (221° C.).

The color retention results after exposure to six Q-UV cycles are summarized in Table 1. As described by ASTM method G 53, the Q-UV method simulates the deterioration and/or color shift of a plastic material caused by sunlight and dew by means of artificial ultraviolet light and condensation apparatus. The test apparatus consists of a series of UV lamps, a heated filtered water supply, and specimen racks. For accelerated weathering evaluations pertaining to this invention, UV-A 340 lamps were employed. The environmental chamber temperature used was 60° C. As is common in the art, one Q-UV cycle is defined as submitting the panel to:

60 hours of UVA 340 lamps ON;

30 hours of an H20 condensate cycle; and 10 hours of UVA 340 lamps ON for a total of 100 hours Q-UV exposure wherein four cycles simulates approximately two years of outdoor south Florida exposure.

TABLE 1

| Sample No. | Description | $\Delta b$ 370° F. (188° C.) | $\Delta b$ 400° F. (204° C.) | $\Delta b$ 430° F. (221° C.) |
|---|---|---|---|---|
| 1 | Control 1 | 2.4 | 2.2 | 2.0 |
| 2 | Control 2 | 2.5 | 2.8 | 2.3 |
| 3 | Control 3 | 2.2 | 2.5 | 3.4 |
| 4 | Improved ASA resin #1 | .3 | .4 | .3 |
| 5 | Improved ASA resin #2 | .2 | .3 | .3 |

It is understood that $\Delta b$ measures the "yellow/blue" color axis that is significantly noticable visual inspection in exterior sidings. Further, in the above experimentation $\Delta b$ is meant to denote weatherability of the styrene copolymer composition.

Further experimentation was conducted with an aromatic copolyamide color retention agent. As with Example 1, the following example, Example 2, is intended to illustrate but not limit the invention.

A weatherable and color-retaining styrene copolymer composition according to the subject ivention ("Improved ASA resin #3") was prepared by adding approximately 3.0% titanium dioxide and approximately 1% of aromatic nylon to an extrudable acylonitrile styrene acrylate (ASA) resin copolymer. A second weatherable and color-retaining copolymer composition according to the subject invention ("Improved ASA resin #4") was similarly prepared by adding approximately 3% of an aroomatic nylon, a third composition according to the subject invention ("Improved ASA resin #5") was similarly prepared by adding approximately 6% an aromatic nylon, and a fourth composition according to the subject invention ("Improved ASA resin #6") was similarly prepared by adding approximately 8% of an aromatic nylon The resins and test plaques were prepared in the same manner as described above. Further, the color retention results were arrived at after seven QUV cycles as described above. In this experimentation, the sheets were extruded at the three temperatures; 340° F. (171° C.), 370° F. (188° C.), and 400° F. (204° C.). These color retention results after exposure to seven QUV cycles are summarized in Table 2.

TABLE 2

| Sample No. | Description | Δb 340° F. (171° C.) | Δb 370° F. (188° C.) | Δb 400° F. (204° C.) |
|---|---|---|---|---|
| 1 | Improved ASA resin #3 | .5 | .6 | .9 |
| 2 | Improved ASA resin #4 | .7 | .9 | .9 |
| 3 | Improved ASA resin #5 | .5 | .8 | .9 |
| 4 | Improved ASA resin #6 | .5 | .5 | .9 |

What is claimed is:

1. A method of improving the weatherability and color retention performance of a styrene copolymer composition, said method comprising the steps of:
   a) providing a styrene resin (A) comprising the polymerization reaction product of monomers (A1) comprising:
      (i) aromatic vinyl compounds, and
      (ii) vinyl cyanides,
   or mixtures of such polymerization reaction products, in the presence of an elaswtomeric rubber (A2) comprising the polymerization reaction product of one or more monomers selected from:
      (i) alkyl acrylates having from 1 to 8 carbon atoms,
      (ii) 1,3-dienes,
      (iii) olefin compounds,
      (iv) ethylenically unsaturated compounds,
      (v) aromatic vinyl compounds,
      (vi) polyfinctionai monomers having a crosslinking effect selected from divinylbenzene, diallyl maleate, diallyl fumarate, diallyl phthalate, allyl methacrylate, butanediol diacrylate, hexanediol diacrylate, triallyl cyanurate, triallyl isocyanurate and acrylic esters of tricyclodecenyl alcohol, and
      (vii) mixtures thereof; and
   b) mixing the styrene resin with a copolymer (A3) which comprises the polymerization reaction product of monomers (A1) comprising:
      (i) aromatic vinyl compounds, and
      (ii) ethylenically unsaturated compounds, or mixtures of such polymerization reaction products, to produce a styrene copolymer composition; and
   c) adding to the styrene copolymer composition from 0.1 to 20% by weight of a partially crystalline polymer (B) as a color retention agent at a minimum temperature of 20° C. below the melting temperature of said polymer (B), wherein the color retention agent resists color shift of the styrene copolymer composition.

2. A method as set forth in claim 1 wherein the step c) comprises adding from 1 to 10% by weight of the partially crystalline polymer (B) to the styrene resin (A).

3. A method as set forth in claim 1 wherein the step c) comprises adding from 2 to 8% by weight of the partially crystalline polymer (B) to the styrene resin (A).

4. A method as set forth in claim 1, wherein aromatic vinyl compounds (i) in (A1) is styrene or α-methylstyrene.

5. A method as set forth in claim 1, wherein the vinyl cyanides (ii) in (A1) is acrylonitrile.

6. A method as set forth in claim 1, wherein (A2) is an ethylene/propylene (EPM) rubber or an ethylene/propylene/diene (EPDM) rubber.

7. A method as set forth in claim 1, wherein the copolymer (A3) comprises a styrene-acrylonitrile copolymer.

* * * * *